March 13, 1962  R. L. WHITELAW  3,025,228
BORON TRIFLUORIDE REGULATING SYSTEM
Filed Nov. 5, 1957  3 Sheets-Sheet 1

INVENTOR.
Robert L. Whitelaw
BY
*J. P. Moran*
ATTORNEY

INVENTOR.
Robert L. Whitelaw
ATTORNEY

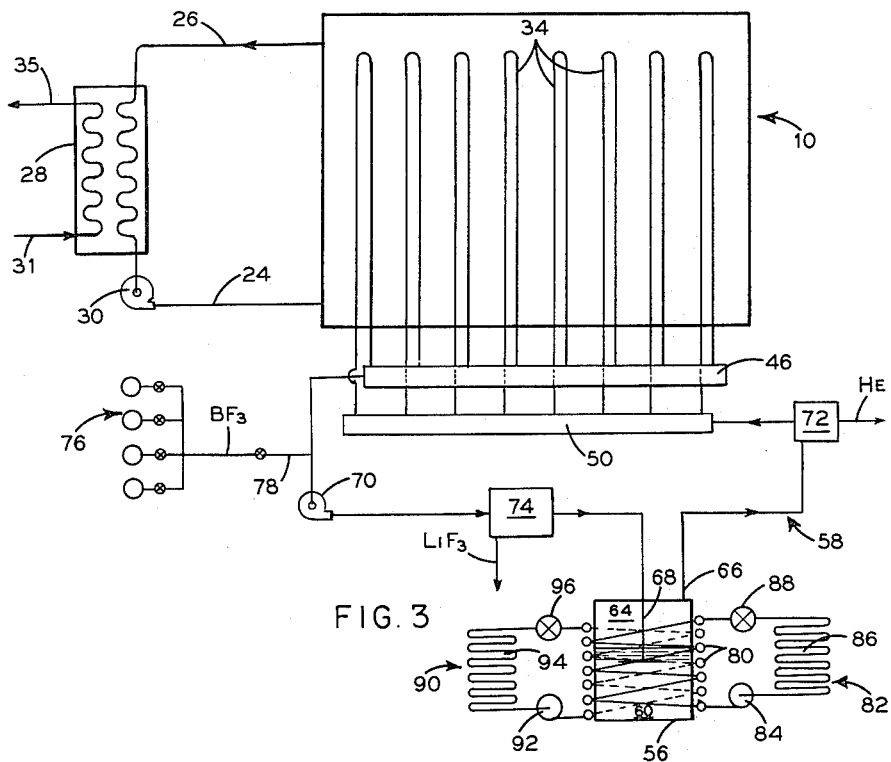

United States Patent Office 3,025,228
Patented Mar. 13, 1962

3,025,228
BORON TRIFLUORIDE REGULATING SYSTEM
Robert L. Whitelaw, Lynchburg, Va., assignor to The Babcock & Wilcox Company, New York, N.Y., a corporation of New Jersey
Filed Nov. 5, 1957, Ser. No. 694,672
7 Claims. (Cl. 204—193.2)

This invention relates generally to the neutronic reactor art and it is particularly concerned with a safety and control device for neutronic reactors and a means and method of regulating the neutronic control device.

In neutronic reactors a neutron fissionable isotope may be subjected to fission by absorption of neutrons and a self-sustaining chain reaction is established by the neutrons evolved by this fission. It is known that massing together sufficient fissionable material containing a neutron fissionable isotope, such as U-233, U-235 or plutonium-239, may form a neutron reactive system under appropriate conditions. This system by reason of its ability to generate neutrons at an equal or greater rate than they are being lost to the system as a result of absorption in the system or leakage from the system, is capable of maintaining a self-sustaining chain reaction of neutron induced fission. In general, such reactors comprise bodies of compositions containing such fissionable material disposed in a neutron slowing material which slows the neutrons to thermal energies. Such slowing material is termed a neutron moderator. Carbon and heavy water are typical moderators suitable for such use. Specific details of the theory and essential characteristics of such reactors are set forth in Fermi et al., U.S. Patent 2,708,656, dated May 17, 1955.

It will be understood that in a reactor of the type referred to in this description a rise in the neutron density is possible and means must be available to limit the rise in neutron density and to stabilize the fission reaction in the reactor and maintain the fission reaction stabilized. The reproduction ratio in a neutronic reactor refers to the reproduction of neutrons employed in the fission reaction. At a reproduction ratio of unity there is no rise or increase in neutron density and the reaction in the neutronic reactor can be considered as stabilized. Accordingly, when a reproduction ratio is greater than unity, the neutron density in the reactor will rise. For a proper control of a reactor in which the reproduction ratio may change, it is necessary to provide a means and method whereby the reproduction ratio can be controlled. This control applies both to the limiting of a rising neutron density and to a falling neutron density which carries the reproduction ratio to less than unity. This control is most feasibly provided by a control of one of the causes of neutron loss which in turn has an effect upon the reproduction ratio. Most customarily, this controlled neutron loss takes the form of neutron absorbers which are intentionally adjustably positioned within the reactor to provide for a variation in neutron absorption with a consequent variation in the neutron density within the reactor. Interior neutron losses are caused by introducing a control element, such as a control rod, into the reactor. This element is capable of absorbing sufficient neutrons to limit the average reproduction ratio in the reactor to unity and less. The control element is capable of variable absorption so that the reproduction ratio can be decreased to well below unity when the full substance of the control element is interpositioned in the reactor; at the same time the reproduction ratio may be permitted to exceed unity when a substantial part of the substance of the control element is removed from within the reactor. Thus, the element such as a control rod, may be varied in its absorption cross section to vary its ability to capture neutrons in the reactor and, consequently, the control of neutron density in the reactor.

When it is desired to increase or decrease the neutron density within a neutronic reactor, it is desirable that the rate of change be obtained in a fine range of gradations. This provides a sensitive control. It is also desirable that the control element have a light mass with consequent low inertia. Further, a uniform absorption of neutrons within the reactor provides a better distribution of the fission reaction than a variable area of neutron absorption. Consequently, it is preferable to distribute a low concentration of neutron absorbing material along a control member, rather than concentrate a high neutron absorption cross section in a small area within the reactor.

It is an object of this invention to provide a means and method for the control of neutron absorption characteristics of a gaseous neutron absorber in a neutronic reactor.

Another object of this invention is the variation of the neutron macroscopic absorption cross section of a uniform area neutron absorption control element within a neutronic reactor.

A still further object of this invention is to provide means in a neutronic reactor of maintaining constant absorption cross section characteristics of a gaseous neutron absorber.

Still another object of this invention is the easy removal of radiation products from a leak proof gaseous control system for a neutronic reactor.

The present invention is particularly concerned with a new means for regulating the absorption characteristics of a gaseous neutron absorber in a reactor for the purpose of controlling the neutron density in the reactor and, consequently, the reproduction ratio. Reactor control may be obtained by the use of a tube or tubes containing a gaseous neutron absorber, such as borontrifluoride gas. The number of neutrons absorbed by the gas will be a function of the number of Boron-10 atoms present in the neutron flux of the reactor. Thus, a variation in the number of Boron-10 atoms will control the neutron density in the reactor. The number of Boron-10 atoms is proportional to the pressure of the gas in the tube and, consequently, the absorption cross section of the gas is proportional to the pressure of the gas.

The control of the density of a gaseous control element in a reactor presents the problem of providing a gas-tight system which is simple in construction and which will provide a uniform distribution of the control element density throughout the control system. High neutron absorbers positioned in reactors for the purpose of control must be variable in absorption cross section characteristics. At the same time, the system must prevent or minimize the danger of escape of radioactive substances. The high mobility and volatility of a gaseous neutron absorber magnifies the danger of such an escape. Consequently, the use of a gaseous neutron absorber for reactor control necessitates a gas-tight system.

This invention provides a means and method of reactor control in which a control system has control tubes, filled with a high neutron absorber gas, positioned in the core of a neutronic reactor so that a variation of the density of the gas varies the absorption cross section in the reactor. The gas in the tubes is maintained under a variable pressure to provide the variations in density of the gas. The system containing the absorber gas contains a circulating fan or pump which, moving the gas enhances the uniformity of its density throughout the system and more importantly increases the speed of reactor response. A container in the system contains a condensed liquid pool of the gaseous neutron absorber and the container is connected to the control tubes within the reactor and to the pump by manifold conduits which provide for the circulation of the gas to and from the container and the liquid pool. The container is provided with cooling means for varying the temperature at the container, and, consequently, varying the temperature of the liquid pool and the vapor pressure of liquid and the density of the gas in the container and throughout the system. The gas and the liquid in the container are kept at equilibrium by the refrigeration means at the container. The gas is circulated through the system to and from the container. Thus, by varying the degree of refrigeration and thus the liquid temperature, the pressure of the gas within the system may be varied. This variation of pressure controls the density of the gas in the system and its absorption cross section and degree of control of neutron density within the reactor.

It will be understood that the reactor control system of this invention and the means of controlling the pressure of the gas in the system may be employed in any reactor requiring a variation in neutron losses for a proper control of the reproduction ratio in the reaction. For the purpose of clarity and better understanding, the invention is described more fully below as employed in a specific neutronic test reactor, as illustrated in the accompanying drawings in which:

FIG. 3 is a flow sheet of the primary coolant and gaseous control components in the reactor.

Figure 1:
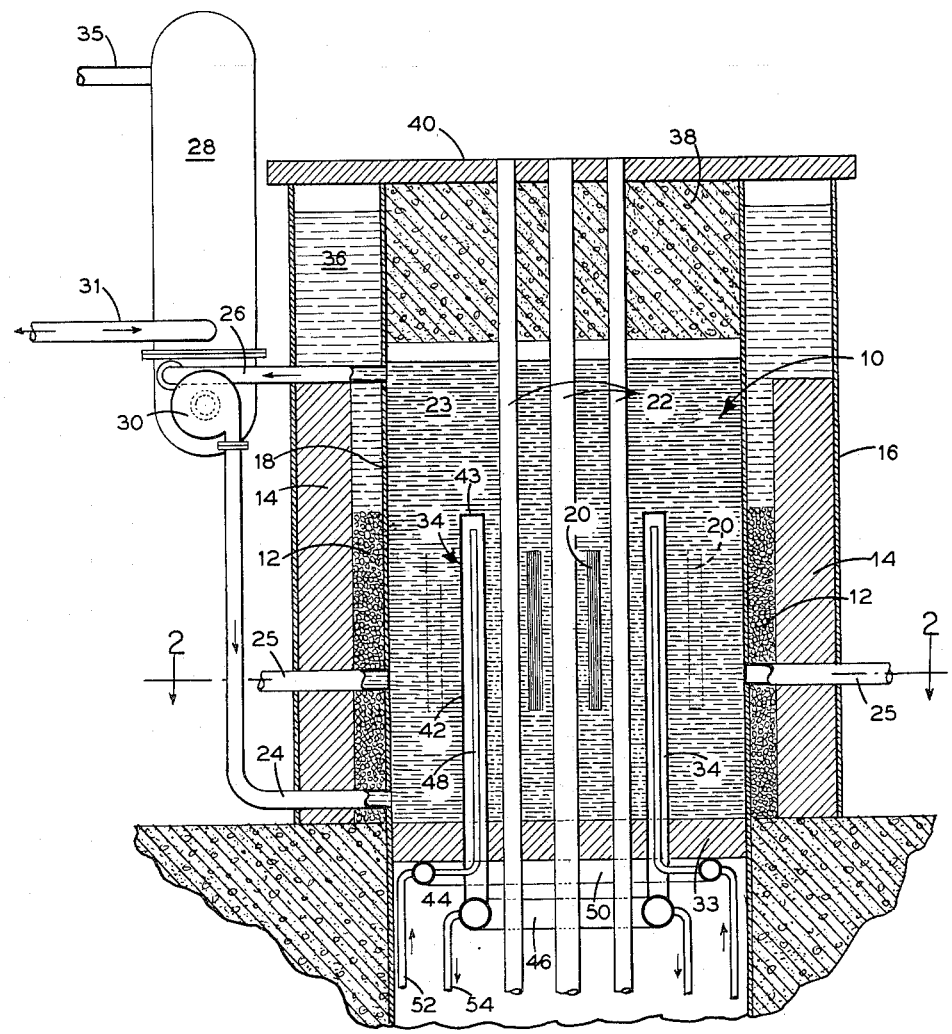
FIG. 1 is a vertical section partly in elevation of a reactor containing the gaseous neutron absorber control system of this invention.

In the embodiment of the invention illustrated, the gaseous control system of this invention is incorporated in a heavy water test reactor. Referring to FIG. 1, a heavy water test reactor is shown in vertical section having a core 10, an annular reflector 12 and a concrete shield 14 contained in a cylindrical tank 16. The active portion or core 10 is contained in a cylindrical core shell 18, in which are positioned a plurality of uniformly spaced fuel elements 20 and through which extend a number of different sized access holes 22. Additional access holes 25 pass through the shield 14 and reflector 12 to provide high flux beam ports. A body of heavy water moderator 23 circulates through the core shell 18 and is supplied through an intake pipe 24 and discharged through an outlet pipe 26, which pipes are connected to a heat exchanger 28 and a pump 30. Forty-eight fuel elements 20 of the plate type are suspended in the core shell 18 and sheathed by aluminum to prevent radioactivity and contamination of the heavy water moderator-coolant. Scram or safety control rods 32 are arranged in a circular pattern and extend longitudinally of the core shell. Control tubes 34, containing a suitable condensable gaseous neutron absorber gas, preferably boron trifluoride gas, pass through a bottom shield 33 and extend longitudinally of the core shell 18. The control conduits or tubes 34 are part of the gaseous neutron absorber control system in the reactor. Sufficient heavy water moderator 23 is introduced into the shell 18 around the uranium to obtain a volume of uranium and heavy water in excess of the critical size for a chain fission reaction. This critical size may be calculated and determined by established methods, such as disclosed in the above noted U.S. Patent No. 2,708,656.

The core shell 18 is surrounded by the reflector 12 adjacent the core 10. The concrete shield 14 surrounds the reflector 12 and the core shell 18, all concentrically arranged within the tank 16.

The annular reflector 12 is made up of a mass of small graphite pebbles immersed in light water. A body of light water 36 is maintained in the annular spaces between the tanks 16 and 18 and above the reflector 12 and shield 14. Above the core is a concrete shielding plug 38 and above that a top shield 40 which covers the core tank 16 and shell 18.

The reflector 12, together with the core shell 18 and its contents which make up the core 10, are referred to herein as the neutronic reactor. The heavy water moderator, together with the fuel elements 20 immersed in the moderator and positioned in the core shell within the reflector 12, constitute the active portion of the reactor, referred to herein as core 10. The role of the reflector 12 in the neutronic reactor is in keeping with the description of neutronic reactors set forth in the above mentioned U.S. Patent No. 2,708,656.

The shield 14 surrounds the graphite pebble reflector 12 and the core shell 18 and serves to prevent the escape of excessive radiation. The action of the concrete shield 14 is in keeping with the description in the above mentioned U.S. patent. The concrete shield 14 is made up of barytes concrete blocks.

As shown in FIG. 1, the test reactor is equipped with two systems of cooling. The primary cooling system employs the heavy water moderator as the coolant. The heavy water coolant passes through the reactor from the bottom to the top, being introduced through the intake pipe 24 and removed through the outlet pipe 26. This permits natural circulation of the coolant through the core 10 when the reactor is shut down. The heavy water coolant passes through the heat exchanger 28 and the heat is transferred to secondary coolant which enters the heat exchanger by pipe 31 and leaves by pipe 35. The secondary cooling water is derived from any suitable supply of fresh water, such as a river or a lake. In the absence of an adequate fresh water supply, cooling towers may be provided to dissipate the heat or sea water may be employed with the necessary precautions against corrosion and radiation poisoning.

The reactor is controlled primarily by the control conduits 34 which are positioned concentrically in a circular pattern about the center of the core. Each control conduit has an outer tube 42 having an upper closed end 43 and a lower open end 44 secured in a toroidal shaped exit manifold 46. An inner tube 48 open at both ends is positioned concentrically within the outer tube and has a supply end opening into a toroidal shaped supply manifold 50. A gaseous neutron absorber is supplied to the system by the line 52 and leaves by the exit manifold 46 by line 54. During the passage through the control conduit, the neutron absorber gas passes upwardly within the inner tube 48 and discharges into the outer tube 42 at the top thereof. The gas then flows down the annulus formed between the inner and outer tubes 42, 48 and passes out through the manifold 50 and outlet line 54. The gaseous neutron absorber is varied in density by variations of its pressure, thus controlling the amount of neutron absorber. The variation of neutron absorber gas pressure is controlled as hereinafter described with reference to FIG. 3.

FIG. 3 illustrates in schematic form the heavy water moderator-coolant circulating system. The pump 30 circulates the heavy water moderator-coolant through the intake pipe 24, the core 10, the outlet pipe 26 and the heat exchanger 28. The secondary cooling water is fed from a suitable source of supply to the heat exchanger 28 through pipe 31.

Figure 2:
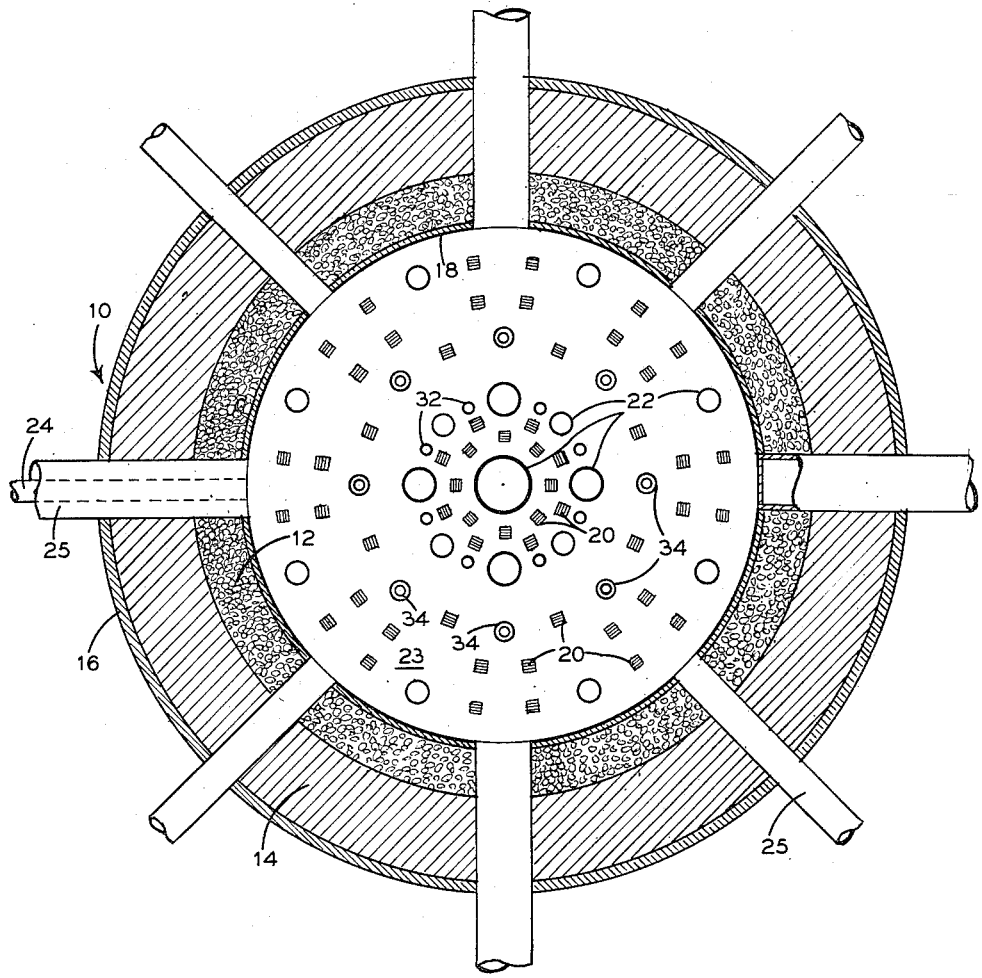
FIG. 2 is a radial section of the reactor taken on the line 2—2 of FIG. 1.

Additionally, FIG. 3 illustrates schematically the gaseous neutron absorber control system and thereon the same numerals are used to indicate apparatus which was more completely illustrated and described with reference to FIGS. 1 and 2. The control conduits 34 are illustrated as a plurality of U-tubes within the reactor 10 and having their inlets connected into the inlet header 50 and their outlets connected into the outlet header 46. Thus, each of the control conduits is arranged to flow the gaseous neutron absorber in serial flow in and out of the reactor and in parallel flow with the other control conduits. A vertically elongated reservoir tank 56 is positioned remote from the reactor core. A flow circuit 58 connects the manifolds 46, 50 and the tank 56 in a closed flow path. A pool 60 of high neutron capture cross-section vaporizable liquid, such as boron trifluoride, is disposed in the tank 56 and has a liquid level 62 above which a gas space 64 is disposed. The tank 56 is arranged with a gas outlet 66 from the gas space 64 and a gas inlet 68 which discharges the incoming gas below the liquid level. The gas is discharged so that while it bubbles up through the liquid, it reaches equilibrium therewith. In the flow circuit 58 there is a pump or fan 70 which assures a continuous and relatively rapid flow of the control gas through the conduits 34 in the core 10. The forced flow of the control gas provides a rapid control response and maintains a more uniform condition of the gas throughout the circuit as the isotope boron 10, which is present in natural boron, breaks into helium 4 and lithium 7 upon absorbing a neutron. These are removed from the circuit 58 by a helium gas separating means 72 and a lithium trifluoride separating means 74. Boron trifluoride gas is supplied to the circuit 58 from bank of gas cylinders 76 via the valve controlled line 78.

In the operation of this invention the boron trifluoride control system is filled, for example, with boron trifluoride gas at a pressure of 2,000 pounds per square inch at 50° F. from the storage tank pressure of 3,000 p.s.i. Under this pressure the boron trifluoride fills the system and enters the tubes 34 which extend into the reactor core 10. The fan 70 continually circulates the boron trifluoride under pressure through the system 58, continuously replacing the boron trifluoride gas in the tubes 34 and drawing off the gas which has been subject to the radiation within the core 10. The gas is drawn into the reservoir 56 and passed through the pool 60 before return to the tubes 34.

A double set of cooling coils 80 are disposed about and in heat transfer relationship with the reservoir tank 56. There are shown in FIG. 3 two coils which are intertwined so that each one cools approximately the same extent of the vertical sides of the tank 56. This arrangement allows the coolant in each coil to act on the pool of liquid to the same extent as the other coil. One of the coils is connected into an evaporative coolant system 82 using Freon 13 (dichloro-difluoro-methane) and having the usual compressor 84, condenser 86 and expansion valve 88. The second coil is connected into another evaporative coolant system 90 which uses sulphur dioxide and has the usual compressor 92, condenser 94, and expansion valve 96. By using these two refrigerants, a pool temperature control range of −200° F. to −50° F. may be obtained. Other refrigerants may be used in combination such as ethane and sulphur dioxide to give a temperature range of −60° F. to +50° F. Those skilled in the art will recognize that many refrigerants in various combinations will give a controlled temperature of the liquid neutron absorber. The gaseous neutron absorber selected and the core physics will determine the temperature range required to obtain the variations of gas pressure necessary for reactor control. The control of the refrigeration of the system is obtained by varying the amount of pressure expansion on the control valves 88 and 96 in response to the demand to maintain the reactor critical.

The boron trifluoride control gas continuously circulated through the described system and passing through its liquid state is under a pressure at equilibrium with the vapor pressure of the liquid state. Variation of the temperature of the liquid pool 60 results in a variation in the vapor pressure of the gas and the density of the gas in the remainder of the control system. At a pressure of 2,000 p.s.i. at 50° F. this pressure can be changed by a change in the vapor pressure of the liquid state, which in turn depends upon the temperature of the liquid state. A variation of temperature in the pool 60 of from +50° F. to −155° F. reduces the gas pressure in the system from 2,000 p.s.i. to 10 p.s.i., respectively. Thus, the degree of cooling applied to the liquid pool 60 controls the gas pressure in the gas control system and, most importantly, in the control tubes 34.

As described above, the absorption cross section of the boron trifluoride gas in the control tubes is a function of the number of Boron-10 atoms present in the neutron flux of the neutronic reactor. The number of Boron-10 atoms in turn is proportional to the pressure of the gas. It is thus seen that the variation in pressure accomplished by the cooling of the pool 60, in which the boron trifluoride is liquefied, results in a variation in the absorption cross section of the gas in the control tubes 34. This provides a means of control of the neutron density in the core 10. The cooling of the pool 60 by the refrigerator coil 80 may be effected by conventional refrigerating techniques, which are responsive to the varying needs of control in the reactor.

The reactor is equipped with a plurality of types of control. The safety rods 32 are operated to provide an emergency control and also as a means for shutting off the reactor. The safety rods are withdrawn when the reactor is placed in operation. The system of controlling the absorption cross section of the boron trifluoride takes effect when the reactor is in operation. This system varies the neutron absorption of the boron trifluoride gas during the reactor cycle.

The boron trifluoride gas may be introduced into the reactor core 10 under a high pressure when the reactor cycle begins and when the greatest quantity of fissionable material, such as U-235, is present. As the fuel material is consumed, the pressure, and consequently the density, of the boron trifluoride gas can be gradually diminished. A fine control of the reaction may also be provided through the boron trifluoride gas in the gaseous control system. This fine control operates automatically at the direction of the reactor control instrumentation, which in turn controls the refrigerating means for cooling the coils 80.

The control system of this invention provides, among other advantages, a minimizing of moving parts within the system. Leakage of the gas from the system is minimized by the elimination of the moving parts and glands for sealing the moving parts which are subject to leakage. The fan 70 may be of the canned rotor type and, thus, the control system is completely sealed with no moving parts or points for leakage of the gas. The circulation enhances the uniform area of neutron absorption and assists in the distribution of a low concentration of neutron absorbing material along the control tubes. The circulation of the control gas permits the removal of the radiation product, such as lithium fluoride and helium, and the supply of new gas from the storage tanks. A further advantage is found in the pressure variation possible in the system of this invention which provides both a wide range of absorption cross sections and a fine range of gradations between various absorption cross sections.

While the invention has been described in connection with a test type of neutronic reactor, it will be understood that it can be employed in any neutronic reactor in which neutron loss is used to provide reactor control. The chain reaction system described is merely exemplary and not limiting insofar as this invention is concerned, as it will be apparent that other similar systems may employ the control system of this invention. Similarly, the gaseous control material specifically described herein is boron trifluoride.

Although the reactor control system has been illustrated using boron-trifluoride as the gaseous neutron absorber, it is obvious that any other gas having a high neutron cross section and which is condensible may be used. Examples of such gases are boron halides ($BCl_3$, $BBr_3$) and the extensive group of boranes. The boranes are various hydrocarbon type molecules having hydrogen, boron and sometimes carbon, and the simplest one is $B_2H_6$.

It will be apparent that the invention is in no way dependent upon the many reactor physics parameters which can be varied within wide limits by the designer, depending upon the particular purpose for which the reactor is intended to be employed. Such parameters include the ratio of fissionable material to non-fissionable material, the moderating, absorbing and scattering properties of the particular materials employed, and other apparent considerations. The actual size of the reactor and the actual mass of fissionable material, as well as the moderator means and the reactor geometry, may be adjusted over a wide range by a suitable choice of these nuclear parameters in accordance with the well-known principles of reactor physics set forth in the Science and Engineering of Nuclear Power, Addison Wesley Press, Inc., Cambridge, Massachusetts, vol. I (1947), and vol. 2 (1949). However, in the interest of clarity, the design specifications of one example of a test reactor as described herein incorporating the present invention are fully set forth below:

Fuel Elements

Elements 20_____ 48 MTR type fuel elements, each 48″ long, highly enriched Uranium–235.

Control System

Safety control rods 32____ 8 cylindrical rods, 10% reactivity per rod.
Regulation control tubes
34 _____ 8 stainless steel tubes, each 2″ inner diameter and 2¼″ outer diameter, boron trifluoride filled at 2,000 p.s.i.

Active Portion and Reflector

| | | |
|---|---|---|
| Length of active portion | feet | 4 |
| Diameter of active portion | do | 6½ |
| Reactor length | do | 25 |
| Reactor diameter, including reflector | do | 12 |
| Reflector material—graphite pebbles and light water | | |
| Critical mass of U–235 | kg | 12.9 |

Moderator-coolant:
  Heavy water in core_____lb.___10,000
  External system_____lb.___50,000

Total _____lb.___60,000

A control system, such as herein described, is capable of use in neutronic reactors generally. Moreover, other means for accomplishing the invention may be provided. The described embodiment is merely exemplary and not limiting insofar as our invention is concerned, since it will be apparent that numerous variations and modifications in the embodiment may be made without departure from the spirit and scope of the invention as defined in the following claims.

I claim:

1. In a nuclear reactor having a core of fissionable material geometrically arranged to undergo a self-sustaining chain reaction, a gaseous reactor control system comprising a plurality of gas-tight control conduits disposed within said reactor core, each of said control conduits including an outer tube closed at one end and a smaller open ended inner tube extending within said outer tube to form an annular flow channel therebetween throughout substantially the length of said outer tube, a vertically elongated reservoir tank having a liquid level therein separating an upper vapor space from a lower pool of high neutron capture cross section vaporizable liquid, flow channel means connecting said control conduits to said reservoir tank to form a closed circulation flow path to cause the flow of gas from the gas space of said reservoir sequentially through the inner and then the outer tube of the control conduits and returned to bubble through the liquid in said reservoir, pump means in said flow channel means for forced recirculation of said gas in said flow path, and heat transfer means in heat transfer relationship with the liquid in said reservoir and arranged to vary the temperature of said liquid and thus vary the neutron absorbing capacity of the gas in the control conduits.

2. In a nuclear reactor having a core of fissionable material geometrically arranged to undergo a self-sustaining chain reaction, a gaseous reactor control system comprising a plurality of gas-tight control conduits disposed within said reactor core, each of said control conduits including an outer tube closed at one end and a smaller open ended inner tube extending within said outer tube to form an annular flow channel therebetween throughout substantially the length of said outer tube, a manifold connected to each of said inner tubes and a separate manifold connected to each of said outer tubes to provide a serial flow arrangement of the inner and outer tubes and a parallel flow arrangement of the control conduits, a vertically elongated reservoir tank having a liquid level therein separating an upper vapor space from a lower pool of high neutron capture cross section vaporizable liquid, flow channel means connecting said manifolds to said reservoir tank to form a closed circulation flow path to cause the flow of gas from the gas space of said reservoir sequentially through the inner and then the outer tube of the control conduits and returned to bubble through the liquid in said reservoir, pump means in said flow channel means for forced recirculation of said gas in said flow path, and heat transfer means in heat transfer relationship with the liquid in said reservoir and arranged to vary the temperature of said liquid and thus vary the neutron absorbing capacity of the gas in the control circuit, said heat transfer means including an evaporative cooling refrigeration system.

3. In a nuclear reactor having a core of fissionable material geometrically arranged to undergo a self-sustaining chain reaction, a gaseous reactor control system comprising a plurality of gas-tight control conduits disposed within said reactor core, a vertically elongated reservoir tank having a liquid level therein separating an upper vapor space from a lower pool of high neutron capture cross section vaporizable liquid, flow channel means connecting said control conduits to said reservoir tank to form a closed circulation flow path to cause the flow of gas from the gas space of said reservoir through the control conduits and returned to bubble through the liquid in said reservoir, and pump means in said flow channel means for forced recirculation of said gas in said flow path.

4. In a nuclear reactor having a core of fissionable material geometrically arranged to undergo a self-sustaining chain reaction, a gaseous reactor control system comprising a plurality of gas-tight control conduits disposed within said reactor core, a vertically elongated reservoir tank having a liquid level therein separating an upper vapor space from a lower pool of high neutron capture cross section vaporizable liquid, flow channel means connecting said control conduits to said reservoir tank to form a closed circulation flow path to cause the flow of gas from the gas space of said reservoir through the control conduits and returned to bubble through the liquid in said reservoir, pump means in said flow channel means for forced recirculation of said gas in said flow path, and heat transfer means in heat transfer relationship with the liquid in said reservoir and arranged to vary the temperature of said liquid and thus vary the neutron absorbing capacity of the gas in the control conduits, said heat transfer means including an evaporative cooling refrigeration system having cooling coils wrapped around the vertical sides of the reservoir tank, said refrigeration system comprising at least two evaporative coolants each in separate coils which are intertwined to cool substantially the same extent of the reservoir liquid.

5. In a nuclear reactor having a core of fissionable material geometrically arranged to undergo a self-sustaining chain reaction, a gaseous reactor control system comprising a plurality of gas-tight control conduits disposed within said reactor core, each of said control conduits including an outer tube closed at one end and a smaller open ended inner tube extending within said outer tube to form an annular flow channel therebetween throughout substantially the length of said outer tube, a manifold connected to each of said inner tubes and a separate manifold connected to each of said outer tubes to provide a serial flow arrangement of the inner and outer tubes and a parallel flow arrangement of the control conduits, a vertically elongated reservoir tank having a liquid level therein separating an upper vapor space from a lower pool of high neutron capture cross section vaporizable liquid, flow channel means connecting said control conduits to said reservoir tank to form a closed circulation flow path to cause the flow of gas from the gas space of said reservoir sequentially through the inner and then the outer tube of the control conduits and returned to bubble through the liquid in said reservoir, pump means in said flow channel means for forced recirculation of said gas in said flow path, and heat transfer means in heat transfer relationship with the liquid in said reservoir and arranged to vary the temperature of said liquid and thus vary the neutron absorbing capacity of the gas in the control conduits, said heat transfer means including an evaporative cooling refrigeration system having cooling coils wrapped around the vertical sides of the reservoir tank, said refrigeration system comprising at least two evaporative coolants each in separate coils which are intertwined to cool substantially the same extent of the reservoir liquid.

6. In a nuclear reactor having a core of fissionable material geometrically arranged to undergo a self-sustaining chain reaction, a gaseous reactor control system comprising a plurality of gas-tight control conduits disposed within said reactor core, a vertically elongated reservoir tank having a liquid level therein separating an upper vapor space from a lower pool of high neutron capture cross-section vaporizable liquid, flow channel means connecting said control conduits to said reservoir tank to form a closed circulation flow path to cause the flow of gas from the gas space of said reservoir through the control conduits and returned to bubble through the liquid in said reservoir, pump means in said flow channel means for forced recirculation of said gas in said flow path, and heat transfer means in heat transfer relationship with the liquid in said reservoir and arranged to vary the temperature of said liquid and thus vary the neutron absorbing capacity of the gas in the control conduits.

7. In a nuclear reactor having a core of fissionable material geometrically arranged to undergo a self-sustaining chain reaction, a gaseous reactor control system comprising a plurality of gas-tight control conduits disposed within said reactor core, a vertically elongated reservoir tank having a liquid level therein separating an upper vapor space from a lower pool of high neutron capture cross-section vaporizable liquid, flow channel means connecting said control conduits to said reservoir tank to form a closed circulation flow path to cause the flow of gas from the gas space of said reservoir through the control conduits and returned to bubble through the liquid in said reservoir, pump means in said flow channel means for forced recirculation of said gas in said flow path, and heat transfer means in heat transfer relationship with the liquid in said reservoir and arranged to vary the temperature of said liquid and thus vary the neutron absorbing capacity of the gas in the control conduits, said heat transfer means including an evaporative cooling refrigeration system.

References Cited in the file of this patent

Nucleonics, vol. 13 (August 1955), pp. 30–33.

Proceedings of the International Conference on the Peaceful Uses of Atomic Energy, August 8–20, 1955, vol. 3, pp. 216, 217, 221.